United States Patent

Cajegas, III

(10) Patent No.: US 9,184,964 B2
(45) Date of Patent: Nov. 10, 2015

(54) LOW SYMBOL RATE RAPID CARRIER ACQUISITION WITH EXTREMELY LARGE FREQUENCY OFFSET FOR DIGITAL COMMUNICATION RECEIVER

(71) Applicant: Comtech EF Data Corp., Tempe, AZ (US)

(72) Inventor: Lazaro F. Cajegas, III, Mesa, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 0 days.

(21) Appl. No.: 14/268,097

(22) Filed: May 2, 2014

(65) Prior Publication Data

US 2014/0241466 A1  Aug. 28, 2014

Related U.S. Application Data

(60) Provisional application No. 61/818,856, filed on May 2, 2013.

(51) Int. Cl.
    *H04L 27/227* (2006.01)
    *H04L 27/00* (2006.01)

(52) U.S. Cl.
    CPC ........ *H04L 27/2271* (2013.01); *H04L 27/0014* (2013.01); *H04L 2027/0026* (2013.01)

(58) Field of Classification Search
    None
    See application file for complete search history.

(56) References Cited

U.S. PATENT DOCUMENTS

| | | | | |
|---|---|---|---|---|
| 4,599,732 A * | 7/1986 | LeFever | ................ | H04L 7/043 375/346 |
| 5,272,446 A * | 12/1993 | Chalmers | ............. | G01R 23/165 329/304 |
| 5,612,948 A * | 3/1997 | Fette | .................... | H04B 7/2646 370/252 |
| 5,892,799 A * | 4/1999 | Jaakkola | ........................ | 375/340 |
| 6,697,439 B1 | 2/2004 | Trivedi et al. | | |
| 6,807,241 B1 * | 10/2004 | Milbar | ................ | H04L 27/2659 375/142 |
| 7,203,227 B1 * | 4/2007 | Currivan | ............ | H04L 12/2801 375/222 |
| 2002/0005802 A1 * | 1/2002 | Bryant et al. | ............ | 342/357.01 |
| 2002/0122498 A1 * | 9/2002 | Dogan | .................... | H04L 7/046 375/259 |
| 2003/0122692 A1 | 7/2003 | Roeckner et al. | | |
| 2003/0231728 A1 | 12/2003 | Phang et al. | | |
| 2004/0001563 A1 * | 1/2004 | Scarpa | ................ | H04L 27/2675 375/326 |
| 2004/0252395 A1 * | 12/2004 | Elliott | ...................... | G11B 5/09 360/51 |
| 2005/0125176 A1 * | 6/2005 | Makhlouf | ........... | H04L 27/2657 702/69 |
| 2007/0098089 A1 * | 5/2007 | Li et al. | ........................ | 375/260 |

* cited by examiner

*Primary Examiner* — Chieh M Fan
*Assistant Examiner* — Sarah Hassan
(74) *Attorney, Agent, or Firm* — Booth Udall Fuller, PLC

(57) ABSTRACT

A method of rapid non-data aided carrier signal acquisition for a low symbol rate carrier signal, comprising receiving and converting an analog intermediate frequency carrier to a digital carrier signal, down-converting the signal to substantially baseband, reducing a sampling rate of the digital carrier signal using a decimation filter, determining a highest Fast Fourier Transform (FFT) based on a result of one or more FFT's generated by an FFT module using a peak finder, selecting an input source for the FFT module using a multiplexer, generating a frequency estimate of the digital carrier signal using a walking coarse detector, tuning a carrier recovery loop (CRL) based on the frequency estimate generated by the walking coarse detector, determining a final carrier frequency offset estimate using a result of the FFT module, modulation removal, and the peak finder, and programming an oscillator within the CRL to the final carrier frequency offset estimate.

16 Claims, 12 Drawing Sheets

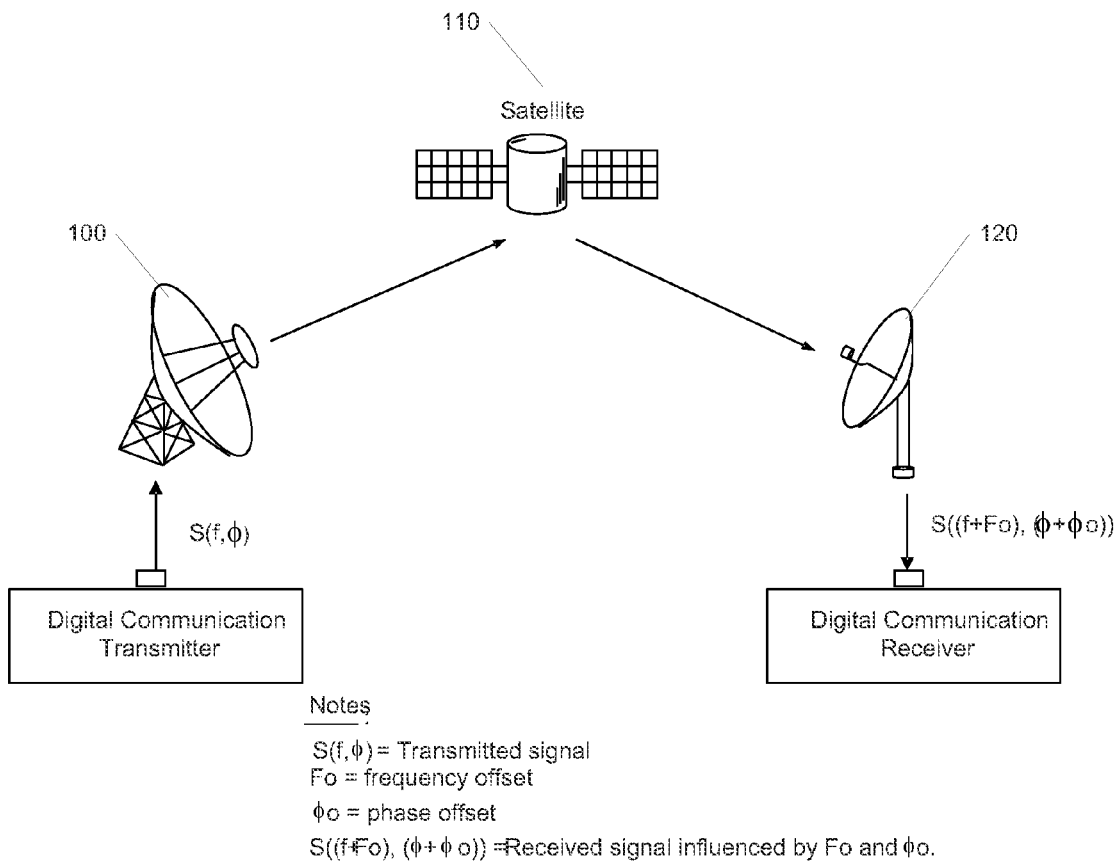
FIG. 1 – PRIOR ART

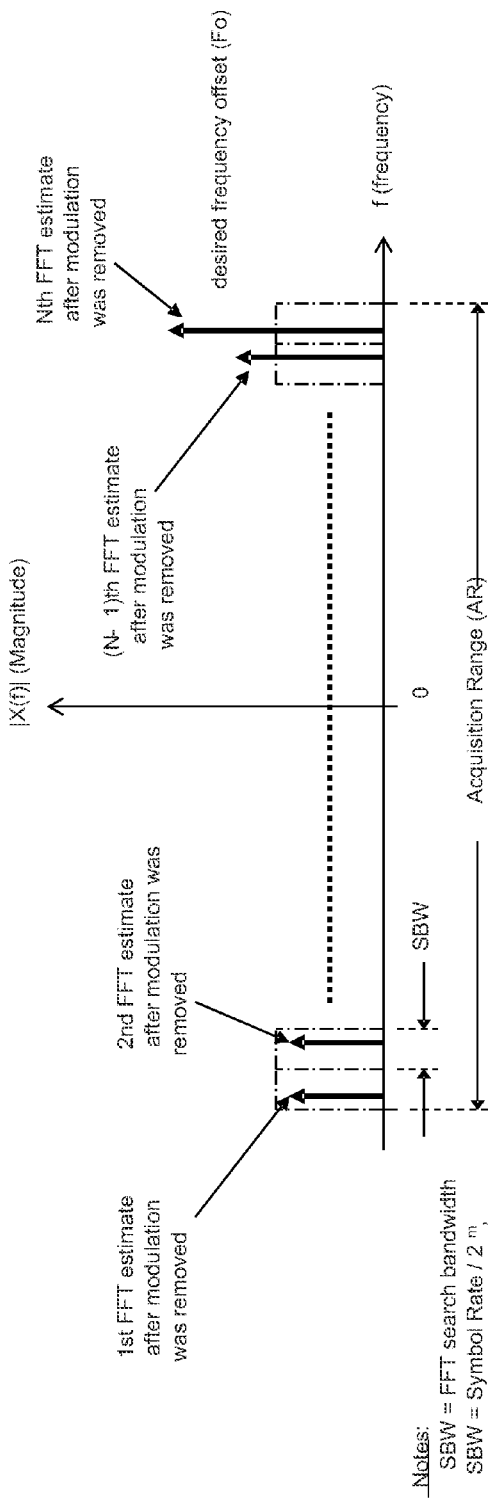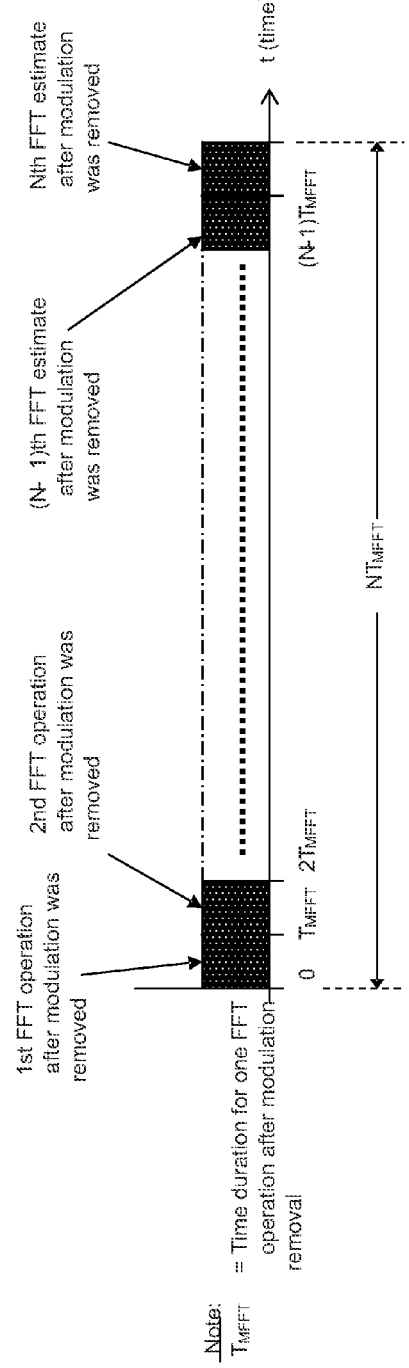
FIG. 2A – PRIOR ART
FIG. 2B – PRIOR ART

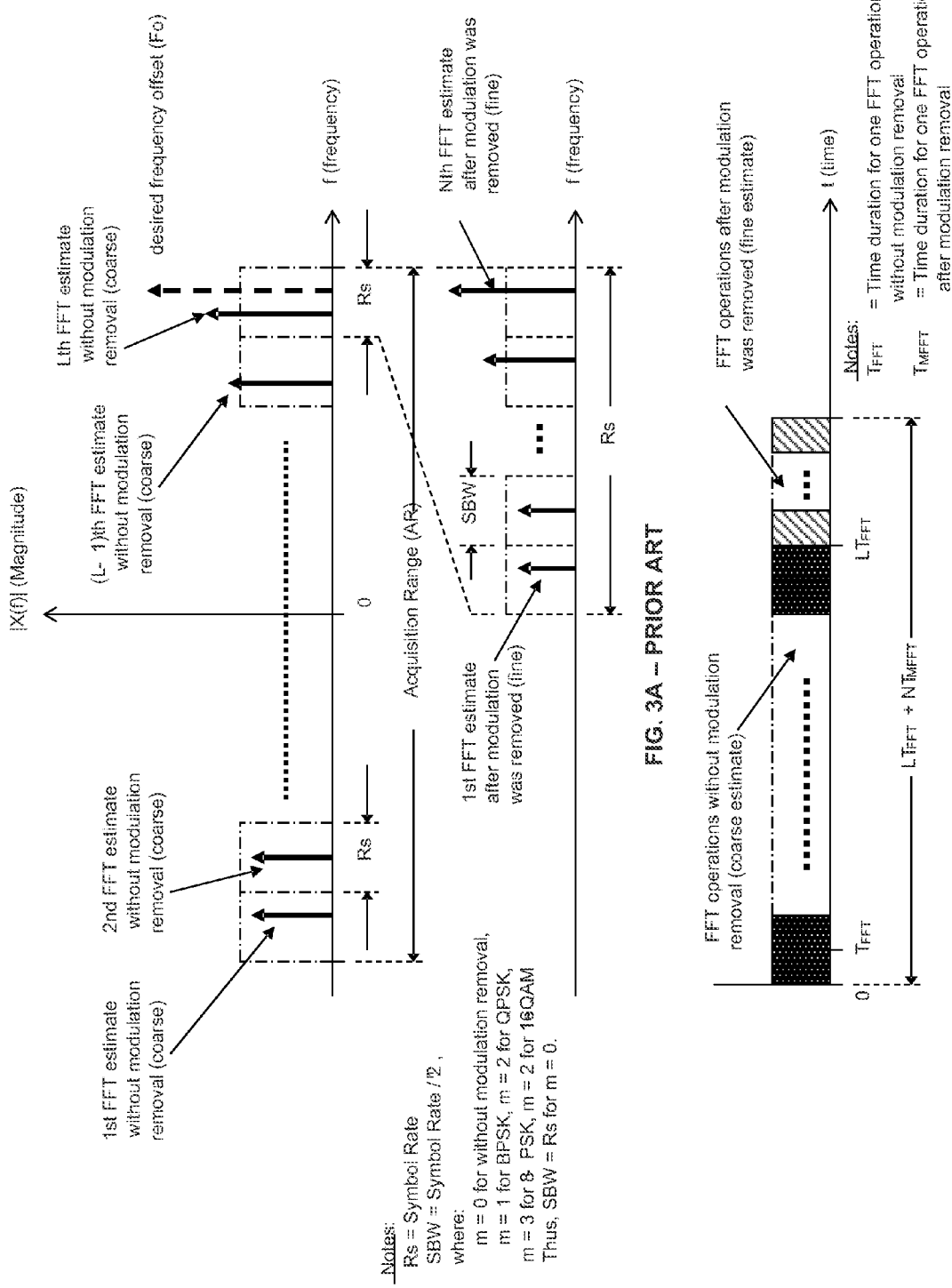
FIG. 3A – PRIOR ART
FIG. 3B – PRIOR ART

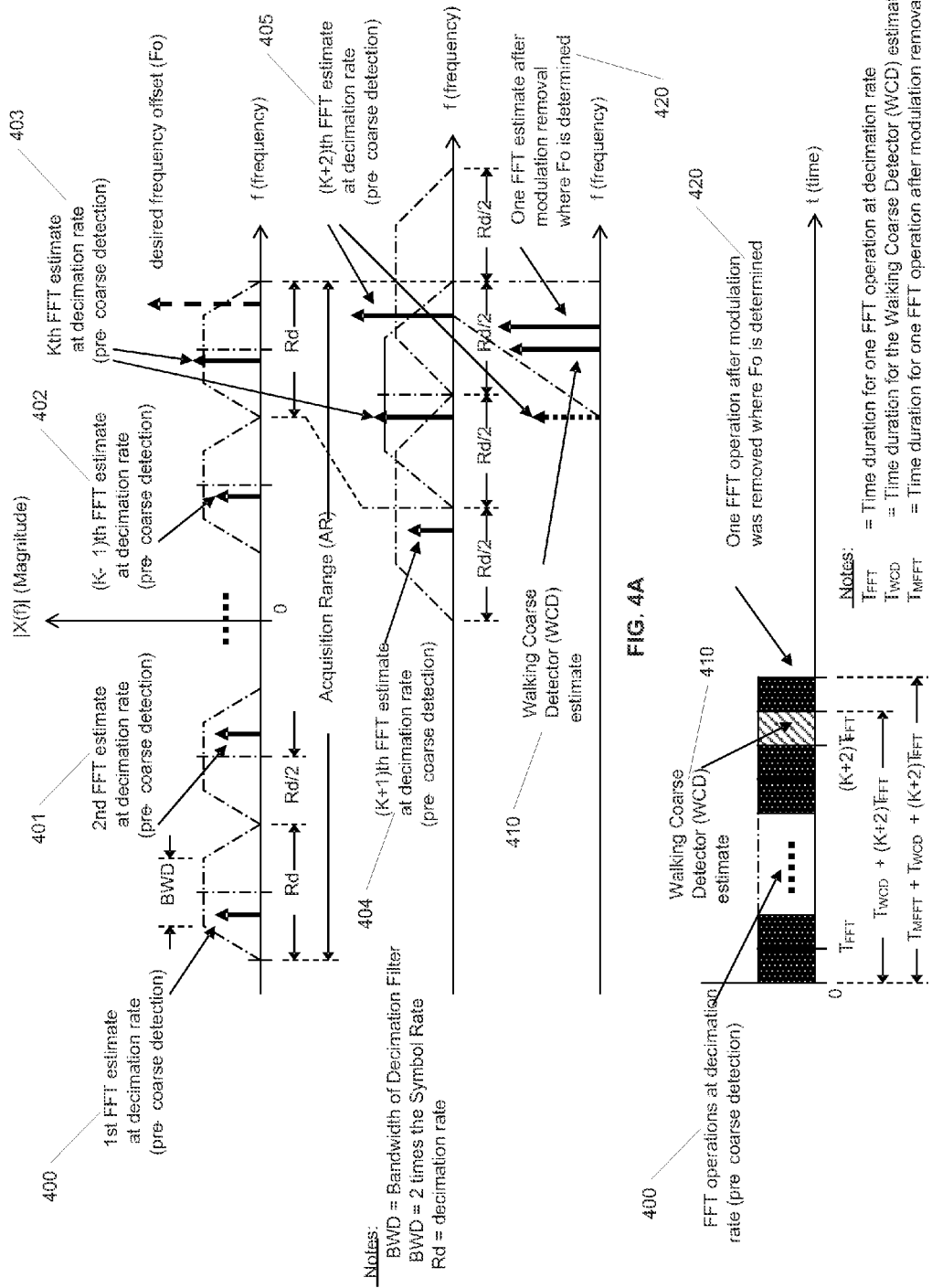

LOW SYMBOL RATE RAPID CARRIER ACQUISITION WITH EXTREMELY LARGE FREQUENCY OFFSET FOR DIGITAL COMMUNICATION RECEIVER

CROSS REFERENCE TO RELATED APPLICATIONS

This document claims the benefit of the filing date of U.S. Provisional Patent Application No. 61/818,856, entitled "Low Symbol Rate Rapid Carrier Acquisition with Extremely Large Frequency Offset for Digital Communication Receiver" to Lazaro F. Cajegas III, which was filed on May 2, 2013, the disclosure of which is hereby incorporated entirely by reference herein.

BACKGROUND

1. Technical Field

Aspects of this document relate generally to telecommunication systems and techniques for transmitting data across a telecommunication channel.

2. Background Art

In digital communication receivers employing M-ary PSK or M-ary QAM, carrier frequency estimation is commonly accomplished using Fast Fourier Transform (FFT) together with modulation removal. As the symbol rate becomes low, that is, less than 32 kilosymbols/second, the frequency offset becomes larger relative to the symbol rate. Hence the acquisition range of the receiver becomes larger than the symbol rate as well. When the acquisition range of the receiver is 40 times the symbol rate, for example, frequency offset estimation known in the prior art will take 160 sequential FFT operations together with modulation removal for QPSK.

To reduce the length and complexity of the detailed description and to establish a current state of the art, Applicant hereby incorporates by reference in their entirety each reference listed in the numbered paragraphs below:

U.S. Pat. No. 4,904,930—Method of Carrier Frequency Estimation, David C. Nicholas, Feb. 27, 1990.

U.S. Pat. No. 4,912,422—Demodulation System for PSK Signals with Low Carrier to Noise Ratio and Large Frequency Offset, Kobayahi et al., Mar. 27, 1990.

U.S. Pat. No. 5,272,446—Digitally Implemented Fast Frequency Estimator/Demodulator for Low Bit Rte Maritime and Mobile Data Communications Without the Use of an Acquisition Preamble, Chalmers et al., Dec. 21, 1993.

U.S. Pat. No. 5,233,632—Communication system receiver apparatus and method for fast carrier acquisition, Baum et al., Aug. 3, 1993.

U.S. Pat. No. 7,151,807—Fast acquisition of timing an carrier frequency from received signal, Ernest C. Chen, Dec. 19, 2006.

U.S. Pat. No. 6,771,699—Method of rapid carrier-frequency offset acquisition using a periodic training sequence, Karaoquz, et al., Aug. 3, 2004.

Heinrich Meyr, Marc Moeneclaey, and Stefan A. Fechtel. Digital Communication Receivers: Synchronization, Channel Estimation, and Signal Processing. John Wiley & Sons, Inc. 1998. pages 457-462.

Bernard Sklar. Digital Communications: Fundamentals and Applications. Second Edition. Prentice Hall PTR. 2001. Pages 63-75 (Sampling Theorem) and Pages 598-643 (Synchronization).

Floyd M. Gardner. Phaselock Techniques. John Wiley & Sons, Inc. 1979.

Alain Blanchard. Phase-Locked Loops: Application to Coherent Receiver Design. John Wiley & Sons, Inc. 1976.

Roland E. Best. Phase-Locked Loops: Design, Simulation, and Applications. Fifth Edition. The McGraw-Hill Companies, Inc. 2003.

Ferdinand Classen and Heinrich Meyr. Two Frequency Estimation Schemes Operating Independently of Timing Information. IEEE 1993. Pages 1996-2000.

SUMMARY

Implementations of a method of rapid non-data aided carrier signal acquisition for a low symbol rate carrier signal may comprise receiving, by a receiver, an analog intermediate frequency carrier signal, converting the analog intermediate frequency carrier signal to a digital carrier signal using an analog-to-digital converter, down-converting the digital carrier signal to a frequency substantially at baseband using a digital quadrature tuner, reducing a sampling rate of the digital carrier signal using a decimation filter, determining a highest Fast Fourier Transform (FFT) based on a result of one or more FFT's generated by an FFT module using a peak finder, selecting an input source for the FFT module using a multiplexer, generating a frequency estimate of the digital carrier signal using a walking coarse detector (WCD), tuning a carrier recovery loop (CRL) based on the frequency estimate generated by the walking coarse detector, determining a final carrier frequency offset estimate using a result of the FFT module, modulation removal, and the peak finder, and programming an oscillator within the CRL to the final carrier frequency offset estimate using a processor such that carrier signal lock is achieved.

Particular aspects may comprise one or more of the following features. The oscillator within the CRL may be programmed to have a sampling rate equal to four times a symbol rate of the carrier signal. The method may further comprise correlating a received modulated carrier signal with a delayed version of the received modulated carrier signal using the walking coarse detector (WCD). The method may further comprise calculating a first frequency estimate of the digital carrier signal by the walking coarse detector (WCD) using an arctangent function and a multiplier of $4Rs/(2\pi)$ where Rs equals a symbol rate of the digital carrier signal. A first discrete complex matched filtered output signal of the walking coarse detector (WCD) may be defined as $I[n]+jQ[n]$. The method may further comprise inputting the first discrete complex matched filtered output signal of the walking coarse detector (WCD) back into the walking coarse detector (WCD). A subsequent discrete complex matched filtered output signal of the walking coarse detector (WCD) may equal $X+jY$ where X and Y are determined by the walking coarse detector (WCD) as:

$$X = \frac{1}{N}\sum_{n=1}^{N}(I[n]I[n-1]+Q[n]Q[n-1])$$

$$Y = \frac{1}{N}\sum_{n=1}^{N}(I[n-1]Q[n]-I[n]Q[n-1])$$

The method may further comprise calculating an incremental frequency estimate of the digital carrier signal by the walking coarse detector (WCD) as:

$$f_W = \frac{fs_{WCD}}{2\pi} \cdot \text{Tan}^{-1}\left(\frac{Y}{X}\right)$$

where:

$f_W$=frequency estimate per walk of WCD; and $fs_{WCD}$=walking coarse detector (WCD) sampling rate which is equal to 4 times a symbol rate (Rs) of the digital carrier signal.

The method may further comprise storing, by the walking coarse detector (WCD), a polarity or sign of the first frequency estimate of the digital carrier signal for comparison with a polarity or sign of a subsequent frequency estimate of the digital carrier signal. The method may further comprise adding subsequent frequency estimates to the first frequency estimate when the sign or polarity of the subsequent frequency estimate is the same as the sign or polarity of the first frequency estimate until a subsequent frequency estimate has a sign or polarity that differs from that of the first frequency estimate.

Implementations of a system for rapid non-data aided carrier signal acquisition for a low symbol rate carrier signal, the system may comprise a receiver configured to receive an analog intermediate frequency carrier signal, an analog-to-digital converter configured to convert the analog intermediate frequency carrier signal received by the receiver to a digital carrier signal, a digital quadrature tuner configured to down-convert the digital carrier signal to a frequency substantially at baseband, a decimation filter configured to reduce a sampling rate of the digital carrier signal substantially at baseband using a decimation filter, an FFT module configured to generate a result of one or more FFT's and determine a highest Fast Fourier Transform (FFT) based on the result using a peak finder, a multiplexer configured to select an input source for the FFT module, a walking coarse detector (WCD) configured to generate a frequency estimate of the digital carrier signal, a carrier recovery loop (CRL) configured to be tuned based on the frequency estimate generated by the walking coarse detector (WCD), the CRL further comprising an oscillator configured to achieve carrier signal lock by being programmed to a final carrier frequency offset estimate that is determined by a processor using a result of the FFT module, modulation removal, and the peak finder.

Particular aspects may comprise one or more of the following features. The oscillator within the CRL may be programmed to have a sampling rate equal to four times a symbol rate of the carrier signal. The walking coarse detector (WCD) may be further configured to correlate a received modulated carrier signal with a delayed version of the received modulated carrier signal. The walking coarse detector (WCD) may be further configured to calculate a first frequency estimate of the digital carrier signal using an arctangent function and a multiplier of 4Rs/(2π) where Rs equals a symbol rate of the digital carrier signal. A first discrete complex matched filtered output signal of the walking coarse detector (WCD) may be defined as I[n]+jQ[n]. The walking coarse detector (WCD) may be further configured to receive as an input the first discrete complex matched filtered output signal that was previously output by the walking coarse detector (WCD). A subsequent discrete complex matched filtered output signal of the walking coarse detector (WCD) equals X+jY where X and Y may be determined by the walking coarse detector as:

$$X = \frac{1}{N}\sum_{n=1}^{N}(I[n]I[n-1] + Q[n]Q[n-1])$$

$$Y = \frac{1}{N}\sum_{n=1}^{N}(I[n-1]Q[n] - I[n]Q[n-1])$$

The walking coarse detector (WCD) may be further configured to calculate an incremental frequency estimate of the digital carrier signal by the walking coarse detector (WCD) as:

$$f_W = \frac{fs_{WDC}}{2\pi} \cdot \text{Tan}^{-1}\left(\frac{Y}{X}\right)$$

where:

$f_W$=frequency estimate per walk of WCD; and $fs_{WCD}$=walking coarse detector (WCD) sampling rate which is equal to 4 times a symbol rate (Rs) of the digital carrier signal.

The walking coarse detector (WCD) may be further configured to store a polarity or sign of the first frequency estimate of the digital carrier signal for comparison with a polarity or sign of a subsequent frequency estimate of the digital carrier signal. The walking coarse detector (WCD) may be further configured to add subsequent frequency estimates to the first frequency estimate when the sign or polarity of the subsequent frequency estimate is the same as the sign or polarity of the first frequency estimate until a subsequent frequency estimate has a sign or polarity that differs from that of the first frequency estimate.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Description, Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 1 depicts an implementation of a digital communications system as known in the prior art.

FIGS. 2A-3B depicts implementations of methods of frequency estimation as known in the prior art.

FIG. 4A depicts an implementation of a method of frequency estimation.

FIG. 4B depicts an exemplary time duration of the method of frequency estimation according to the implementation of FIG. 4A.

DESCRIPTION

Figure 5:
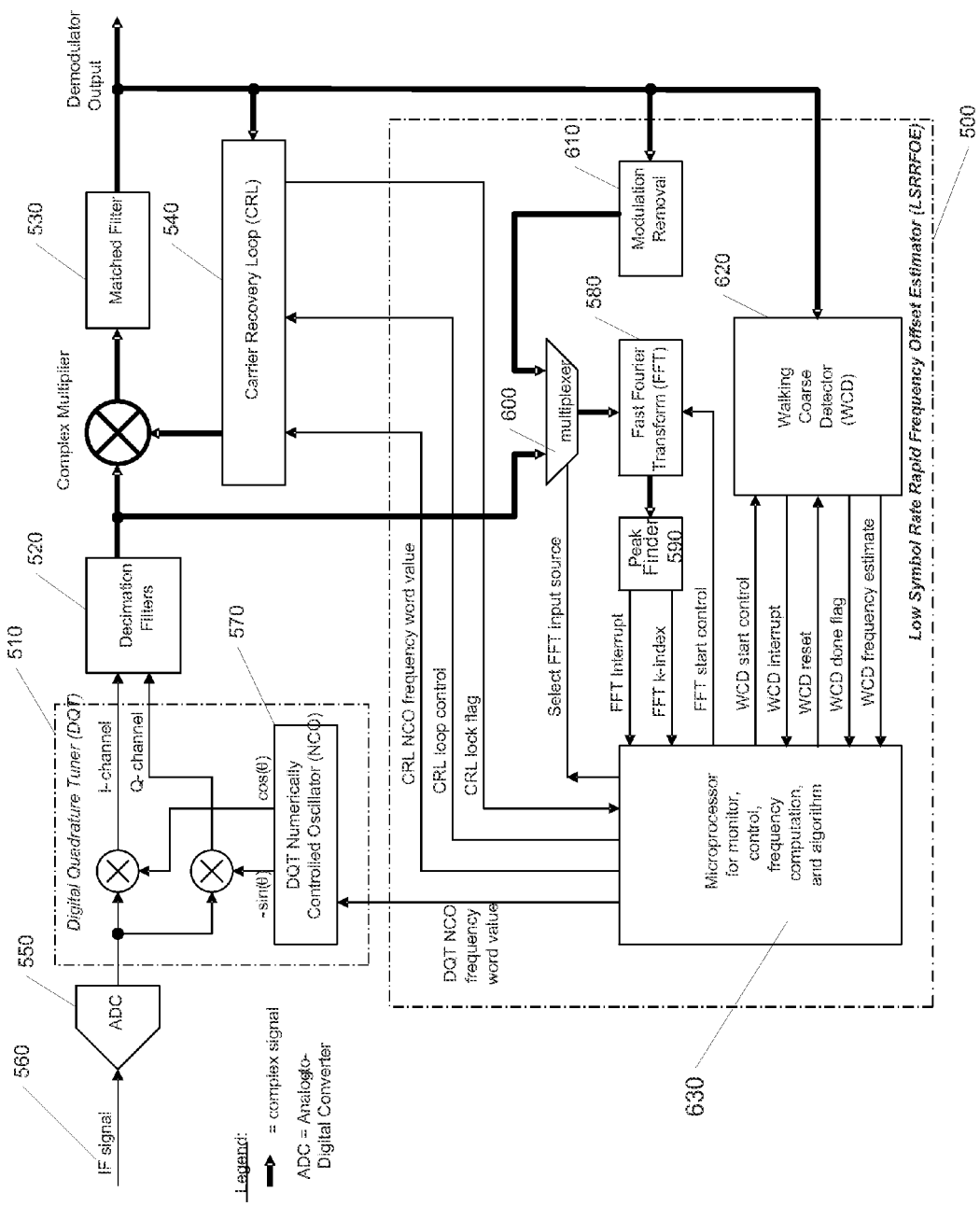
FIG. 5 is an exemplary architecture of an implementation of a system for low symbol rate rapid carrier acquisition.

This disclosure, its aspects and implementations, are not limited to the specific components, frequency examples, redundancy configurations or methods disclosed herein. Many additional components and assembly procedures known in the art consistent with embedding meta-data techniques are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

Digital communication receivers employing M-ary PSK or M-ary QAM scheme requires carrier synchronization before the actual demodulation process begins. In places where the description above refers to particular implementations of to telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

FIG. 1 shows an example of digital communication system as known in the prior art. As illustrated, the transmitted signal, $S(f, \phi)$, passes from the transmitter 100 through satellite 110 and then to the receiver 120, the received signal, $S((f+Fo), (\phi+\phi o))$, has carrier frequency and phase deviations known as frequency offset (Fo) and phase offset ($\phi o$) respectively. These offsets are caused by the drifting nature of the local oscillators used in the satellite 110 and in the frequency upconverters and downconverters used in the ground stations 100, 120. The most critical estimation is the carrier frequency offset, which is normally determined first prior to phase offset estimation. This is because if the carrier frequency offset estimation is incorrect, then the phase offset estimation will be incorrect as well. Implementations of the system and method disclosed herein focus on the frequency estimation rather than the phase offset determination, which is taken care of by the carrier recovery loop (CRL) circuitry.

Generally, carrier frequency acquisition methods are classified as either non-data-aided or data-aided acquisition. Data-aided acquisition requires a cyclic or periodic synchronization sequence, or a training sequence, which also known to one or ordinary skill in the art as a preamble. Non-data aided acquisition, on the other hand, requires no preamble or synchronization sequence and relies on the presence of random symbols generated by the transmitter. The implementations disclosed herein are each intended to be directed toward non-data aided acquisition, in which carrier frequency acquisition occurs without the help of a preamble or any predefined synchronization sequences.

The requirement for accelerated carrier acquisition is necessary to avoid long periods of loss in communication service. Most of the non-data aided acquisition methods present in the prior art use the popular Fast Fourier Transform (FFT) and modulation removal scheme, which means that modulation has to be removed first prior to FFT operation. As is known in the prior art, the acquisition range of a non-data aided frequency estimation scheme is limited to the FFT search bandwidth (SBW), which is dictated by the FFT sampling rate ($F_s$) and modulation removal factor ($2^m$). The FFT search bandwidth (SBW) is determined as:

$$SBW = \frac{F_s}{2^m}$$

The FFT sampling rate ($F_s$) is a function of symbol rate. In common practice, the sampling rate is equal to the symbol rate (Rs) when modulation removal is part of the frequency estimation process. This is because it provides the best performance in frequency estimation under the influence of additive white Gaussian noise (AWGN) especially in higher-order modulation such as 8-PSK. Regarding modulation removal factor ($2^m$), m=1 for BPSK, m=2 for QPSK, m=3 for 8-PSK, m=2 for 16-QAM, and m=0 when there is no modulation removal. As the symbol rate becomes low, that is, less than 32 kilosymbols per second (ksps), the acquisition range of frequency estimation becomes larger than the symbol rate. As an example, a symbol rate of 600 ksps with receiver acquisition range of ±200 kHz has a total of 400-kHz acquisition range. In this case the symbol rate is higher than the total acquisition range. If the symbol rate is 10 ksps with the same acquisition range of 400 kHz, then the symbol rate is lower than the acquisition range that is 40 times the symbol rate.

FIGS. 2A-B illustrate one method of the prior art. As shown, frequency estimation is accomplished by subdividing the acquisition range (AR) into multiples of SBW. The vertical arrow inside the SBW represents the highest peak as a result of FFT. As an example, for QPSK at 10 ksps (or kHz) with an acquisition range (AR) of 400 kHz, SBW is computed as 10 kHz/$2^2$=2.5 kHz. Hence, the number of sequential FFT operations together with modulation removal is AR/SBW=400/2.5=160. Sequential FFT is used since it only requires one FFT module and hence the implementation cost and complexity is less. However, parallel FFT operations could be used but this will require banks of match filters, digital local oscillators, and lots of FFT modules making it more costly to implement and power consumption will be of great concern. In any case, the drawback of this method is that during the estimation, it is likely that the frequency estimate could be a false peak, thereby increasing the number of FFT operations. As given in the example for QPSK 10 ksps with AR=400 kHz, 160 FFT operations are required for an ideal case without any false peak, but when there is a false peak, this will be more than 160 FFT operations and may even be as high as twice this number.

In order to reduce the number of sequential FFT operations, a modified version of the methods used in the prior art may be used. This is shown in FIGS. 3A-B. In this case, the acquisition range (AR) is subdivided into multiples of symbol rate (Rs) and FFT without modulation removal is carried on as the first step of estimation. In this step, the highest FFT magnitude among its subdivided frequency band will be declared as the coarse frequency estimate. In this process, note that SBW is equal to Rs since modulation removal is not used and knowing that FFT sampling rate is equal to Rs. The second and last step of frequency estimation is subdividing the Rs where the coarse estimate was found into multiples of SBW. Note that SBW is no longer equal to Rs since modulation removal is used. In a similar fashion as the coarse estimate, the last step takes the highest FFT magnitude and referred to it as the fine frequency estimate. Using the previous example, for QPSK at 10 ksps with an acquisition range (AR) of 400 kHz, the number of FFT operations for the coarse frequency estimation is AR/Rs=40. And the number of FFT operations for the fine frequency estimate is Rs/SBW=10/2.5=4. This results in the total number of FFT operations equaling 44.

In implementations of the system and method disclosed herein, the number of FFT operations of the above scheme is reduced significantly, thereby significantly decreasing the time duration for carrier acquisition. As shown in FIGS. 4A-B, instead of evaluating the individual frequency band at the symbol rate (Rs), which is at the output of the matched filter, each band will be analyzed at a decimation rate (Rd) that is at the output of the decimation filter. The decimation filter has a bandwidth of twice the symbol rate or more, which is referred to as BWD (bandwidth of decimation filter) and its decimation rate, which becomes the FFT sampling rate, is four times the symbol rate (Rs). The initial frequency estimate is carried on using FFT and selecting the highest peak in terms of FFT magnitude. This process is referred to as pre-coarse estimation or detection 400, 401, 402, 403, 404, 405. The coarse frequency estimation is accomplished using the walking coarse detector (WCD) 410, which uses the matched filter output. The WCD 410 is a non-FFT based estimator, which avoids false detection that is normally encountered by using multiple FFTs. The time duration of WCD 410 is almost the same time period as one FFT with modulation removal. The final estimate 420 is accomplished by using one FFT with modulation removal at the matched filter output. As an example, for QPSK at 10 ksps with an acquisition range (AR) of 400 kHz, as in the previous example, the number of FFT operations at pre-coarse detection is (AR/Rd)+2=400/(4×10)+2=12. Then this number plus one FFT operation with modulation removal for final estimate becomes 13. If WCD operation is considered as one FFT operation, then a total of 14 operations which is more than a 50% reduction compared to the second method of the prior art and more than a 90% reduction from the first method of the prior art. With this reduction in the number of sequential FFT operation, the speed of carrier acquisition is greatly increased.

The implementations of the system and method described herein are also based on the following assumptions. First, the automatic gain control (AGC) of the digital communication receiver must converge quickly and must be stable. Secondly, the symbol clock recovery loop (also known as symbol timing loop, STL) is assumed to achieve a lock and remain stable. It is also assumed that there are no adjacent carriers within the acquisition range. There are numerous existing methods to achieve these assumptions which one of ordinary skill in the art would be familiar with and thus, will not be described here.

Additionally, implementations of the carrier acquisition method being presented involve the rapid carrier frequency offset estimation module and its connectivity with the digital quadrature tuner (DQT), digital filters, and carrier recovery loop (CRL). The DQT basically frequency down-converts the intermediate frequency (IF) signal to near-zero IF signal called baseband. The CRL plays an important role in achieving reliable carrier acquisition with proper design of its loop parameters. Although it is not the intention herein to discuss in detail the CRL design since it is based on phase-lock loop principle that is known in the art, there is an important requirement in the selection of the FFT resolution relative to the CRL loop bandwidth.

FIG. 5 shows one example of an implementation of the novel architecture of the low symbol rate rapid carrier acquisition system. As illustrated, it is comprised of low symbol rate rapid frequency offset estimator (LSRRFOE) 500 and its connectivity with the digital quadrature tuner (DQT) 510, decimation filter 520, matched filter 530, and carrier recovery loop (CRL) 540. All the building blocks as shown, except for the analog-to-digital converter (ADC) 550, can be implemented using a field-programmable logic array (FPGA) device for real-time digital signal processing (DSP) operation which provides even faster carrier acquisition times than a DSP processor with memory which stores data first before processing it.

Figure 9:
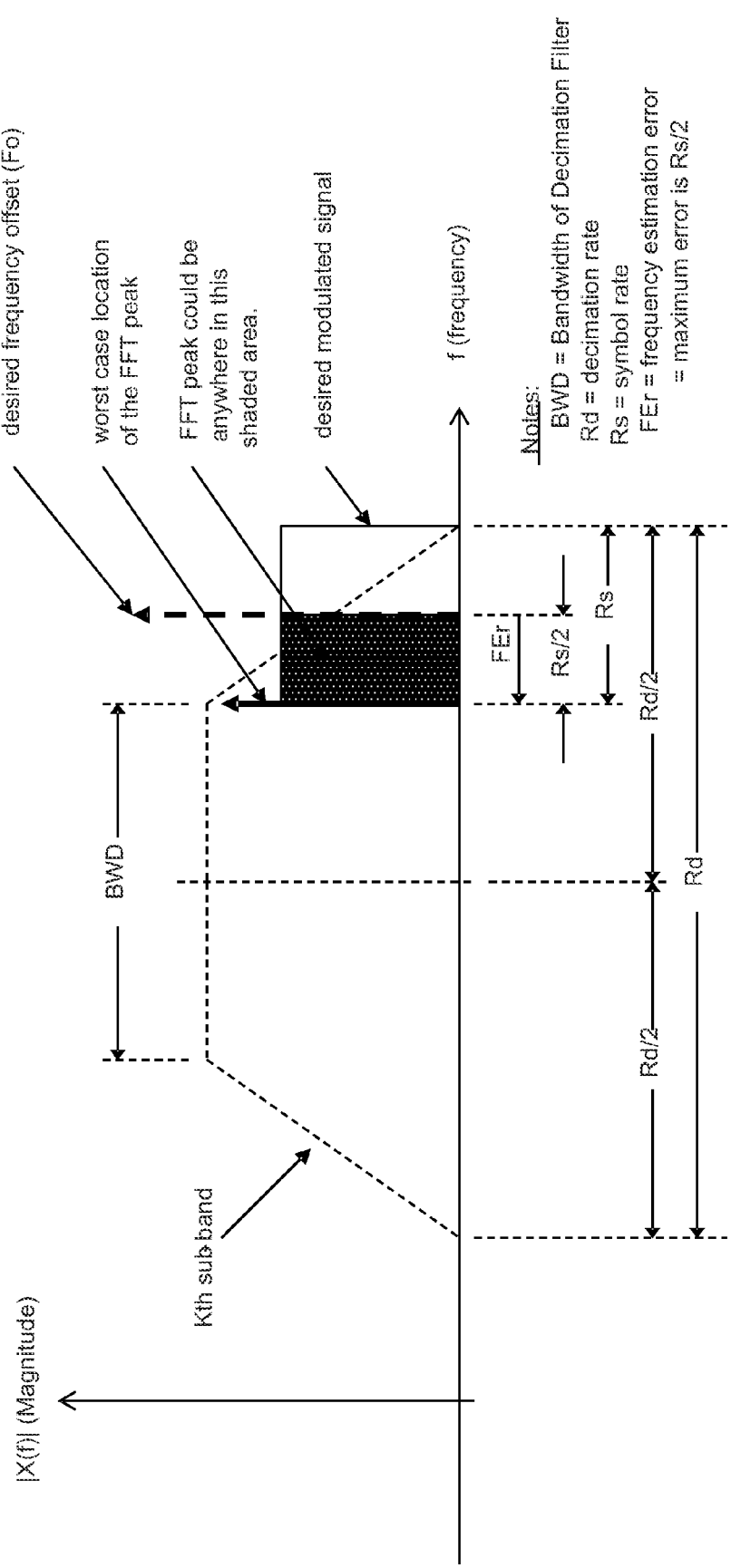
FIG. 9 depicts an example of pre-coarse detection maximum error in frequency estimation.

As depicted in FIG. 5, the analog intermediate frequency (IF) signal 560 comes in and is then converted to a digital signal using the analog-to-digital converter (ADC) 550. The signal is then frequency down-converted close to baseband (or zero IF) using the digital quadrature tuner (DQT) 510. The frequency down-conversion process of the DQT 510 is known in the prior art and thus, it will not be covered herein. The DQT 510 makes it possible to provide wide acquisition range for the receiver since the sampling rate is equal to the ADC sampling rate (typically 120 MHz fixed frequency). The DQT 510 can be tuned using its numerically controlled oscillator (NCO) 570 and is given by this equation:

$$R_{NCO} = \frac{2^B}{Fs_{DQT}} \cdot f_{DQT}$$

where:
B=Bit width of the NCO (or bit size of the NCO)
$Fs_{DQT}$=Sampling rate of DQT (in Hz) which is also the ADC sampling rate
$f_{DQT}$=desired frequency of DQT (in Hz)
$R_{NCO}$=frequency word value to be loaded into the NCO register Inside the NCO module 570, the $R_{NCO}$ drives the sine and cosine look-up table (LUT) in order to generate the digital sine and cosine signals. The output of the DQT 510 is then fed to the decimation filter 520. This filter provides two major functions: 1) filtering out the unwanted signals; and 2) reducing the sampling rate for downstream signal processing. Typically the sampling rate of the decimation filter (which is also called as decimation rate, Rd) is four times the symbol rate (Rs). As an example, for Rs=10 kHz, Rd=4Rs=40 kHz which is significantly smaller than 120 MHz as the ADC sampling rate. Reduction of sampling rate for downstream signal processing offers numerous advantages such as less complexity of the design for the matched filter 530, carrier recovery loop (CRL) 540 and symbol timing loop (STL), a lower implementation cost, and most of all, the power consumption is greatly reduced. It is not the intent herein to discuss in detail the design and implementation of the decimation filter because such filters are known in the prior art. Assuming that the desired modulated signal is within the decimation rate (Rd), the maximum error in frequency estimation as seen at the decimator filter output is half the symbol rate (Rs/2) as shown in FIG. 9.

The core of an implementation of the disclosed system for rapid acquisition is comprised of modules enclosed in dotted lines as shown in FIG. 5 and referred to as the low symbol rate rapid frequency offset estimator (LSRRFOE) 500. The LSR-RFOE 500 comprises the FFT module 580, peak finder 590, multiplexer 600, modulation removal 610, walking coarse detector (WCD) 620, and microprocessor 630. The FFT module 580 computes the fast Fourier Transform and the peak finder 590 determines the highest FFT magnitude based on the FFT results. The multiplexer 600 selects the input source for the FFT which is either the output of the decimation filter 520 or the output of the matched filter 530. The microprocessor 630 computes the frequency estimate from the FFT using the k-index, controls the DQT 570 and CRL 540 modules, and monitors the status of the CRL lock flag.

Figure 6:
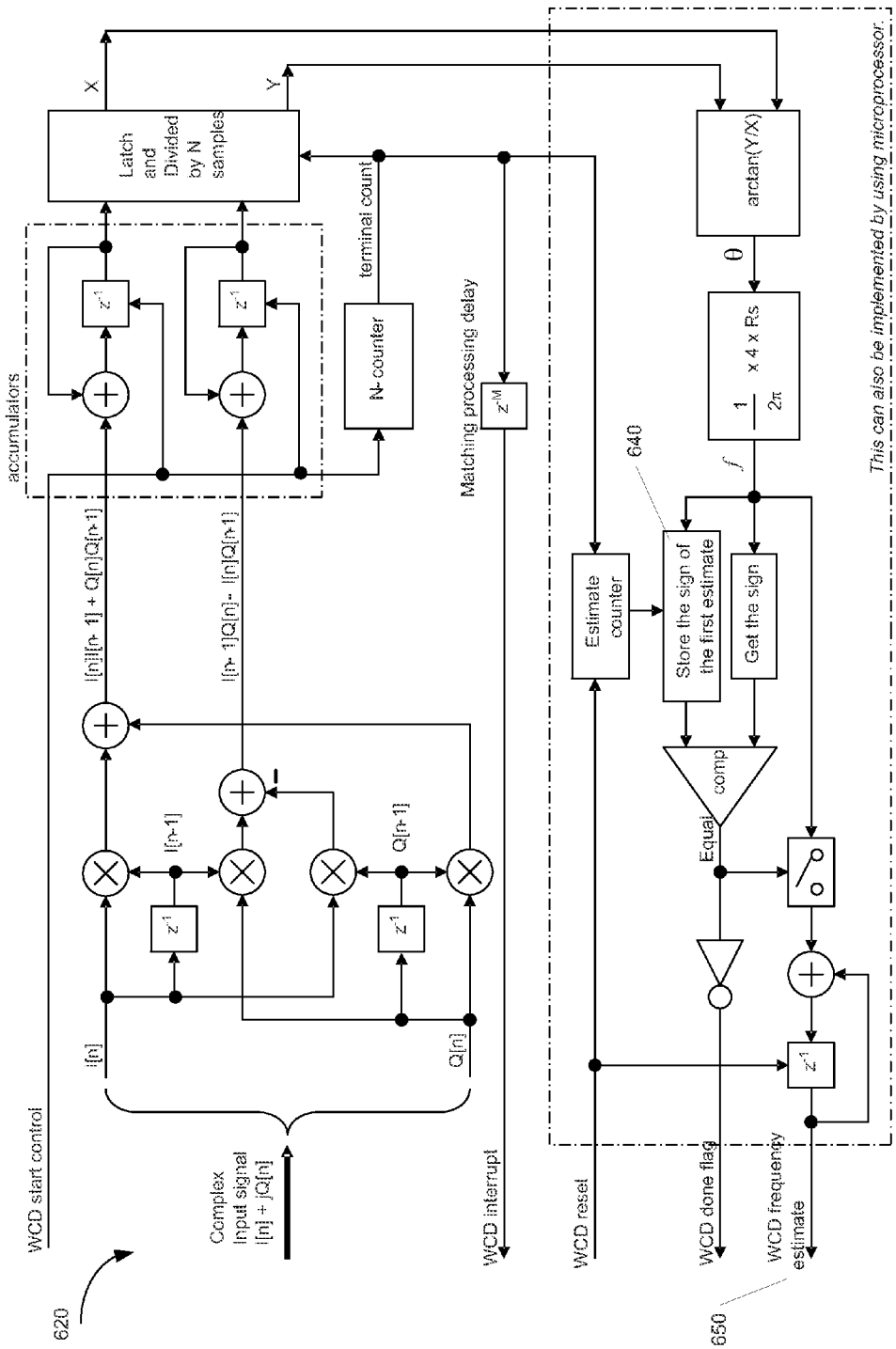
FIG. 6 is a block diagram an implementation of system architecture of a walking coarse detector.

FIG. 6 illustrates the building blocks of an implementation of a walking coarse detector (WCD) 620. This detector is called a 'walking' coarse detector because it walks towards the desired frequency offset in one direction. The WCD 620 is based on a modified frequency estimator known in the prior art. It can roughly estimate the frequency up to (1+β) times symbol rate (Rs), where β is the excess bandwidth factor or roll-off factor of a matched filter, as described in the prior art. With this estimation range, it will cover the maximum error of Rs/2 incurred during the pre-coarse detection. WCD 620 starts correlating the received modulated signal by the delayed version of the received modulated signal and then, averaged to a certain number of samples N, and the first estimate is computed using arctangent function together with a multiplication factor of 4Rs/(2π). Let I[n]+jQ[n] be the discrete complex matched filtered output signal which will be the input to the WCD 620. The output X+jY is determined as:

$$X = \frac{1}{N}\sum_{n=1}^{N}\left(I[n]I[n-1]+Q[n]Q[n-1]\right)$$

$$Y = \frac{1}{N}\sum_{n=1}^{N}\left(I[n-1]Q[n]-I[n]Q[n-1]\right)$$

To calculate the frequency estimate per walk of WCD 620, the equation is:

$$f_W = \frac{fs_{WCD}}{2\pi}\cdot\mathrm{Tan}^{-1}\!\left(\frac{Y}{X}\right)$$

where:
$f_W$=frequency estimate per walk of WCD
$fs_{WCD}$=WCD sampling rate which is equal to 4 times the symbol rate (i.e. 4×Rs)

At this point, the polarity or the sign of the first estimate is stored and will be used as the comparison for the next estimate. The first estimate will be added to the new estimate when the sign of this new estimate does not change. The accumulation of the estimate will stop until the new estimate differs its sign from the first estimate. The final accumulated estimate will be the WCD frequency estimate 650. Hence, the WCD frequency estimate ($f_{WCD}$) 650 is determined as:

$$f_{WCD} = \sum_{i} f_{Wi}$$

if sign of first estimate = sign of current estimate

If part of the WCD 620 is implemented in the microprocessor 630, the microprocessor 630 is used to compute the frequency estimate 650 of WCD 620. WCD 620 is designed to operate properly at four times the symbol rate (4×Rs).

After the WCD estimate 650, the CRL 540 is tuned at this estimate and then the FFT 580 together with modulation removal 610 and peak finder 590 determines the actual frequency offset, which is the final estimate. The calculation of the frequency offset using FFT is done in the microprocessor 630 using the FFT k-index with the highest peak in terms of FFT magnitude. The sampling rate of the FFT together with the modulation removal is equal to the symbol rate. The main reason for using the sampling rate equal to the symbol rate is to provide the best performance in the presence of additive white Gaussian noise (AWGN) especially when operating at higher-order modulation such as 8-PSK.

After the final frequency estimation, the CRL numerically controlled oscillator (NCO) will be programmed by the microprocessor 630 using the estimated frequency. The programming equation of the CRL NCO is similar to DQT NCO except that the sampling rate is four times the symbol rate (4Rs). The CRL 540 is based on phase-locked loop (PLL) principle. In practice, where Doppler frequency is not of concern, the CRL 540 is implemented as a second-order PLL and can be thought of as a proportional and integration PLL.

This PLL has a proportional term and an integration term. Basically, the PLL has two modes of operation, namely acquisition and tracking mode. Generally, the loop bandwidth in tracking mode is smaller than the loop bandwidth in acquisition mode. Since the CRL 540 is based on PLL, the loop parameters of the CRL 540 can be designed and are generally known in the prior art and for this reason, it will not be covered here in detail. The only thing to note is that the FFT frequency resolution must be chosen such that it is within CRL loop bandwidth (LBW). Let $N_{FFT}$=the number of FFT samples and $F_s$=the sampling rate. The FFT frequency resolution (FFR) is:

$$FFR = \frac{F_s}{N_{FFT}}$$

$$FFR \leq CRL\ LBW$$

The main reason for this is that the CRL 540 will be able to pull-in the carrier reliably at the estimated frequency. The LBW is determined depending upon how much noise is being applied or based on the signal-to-noise (SNR) requirement.

Figure 7A:
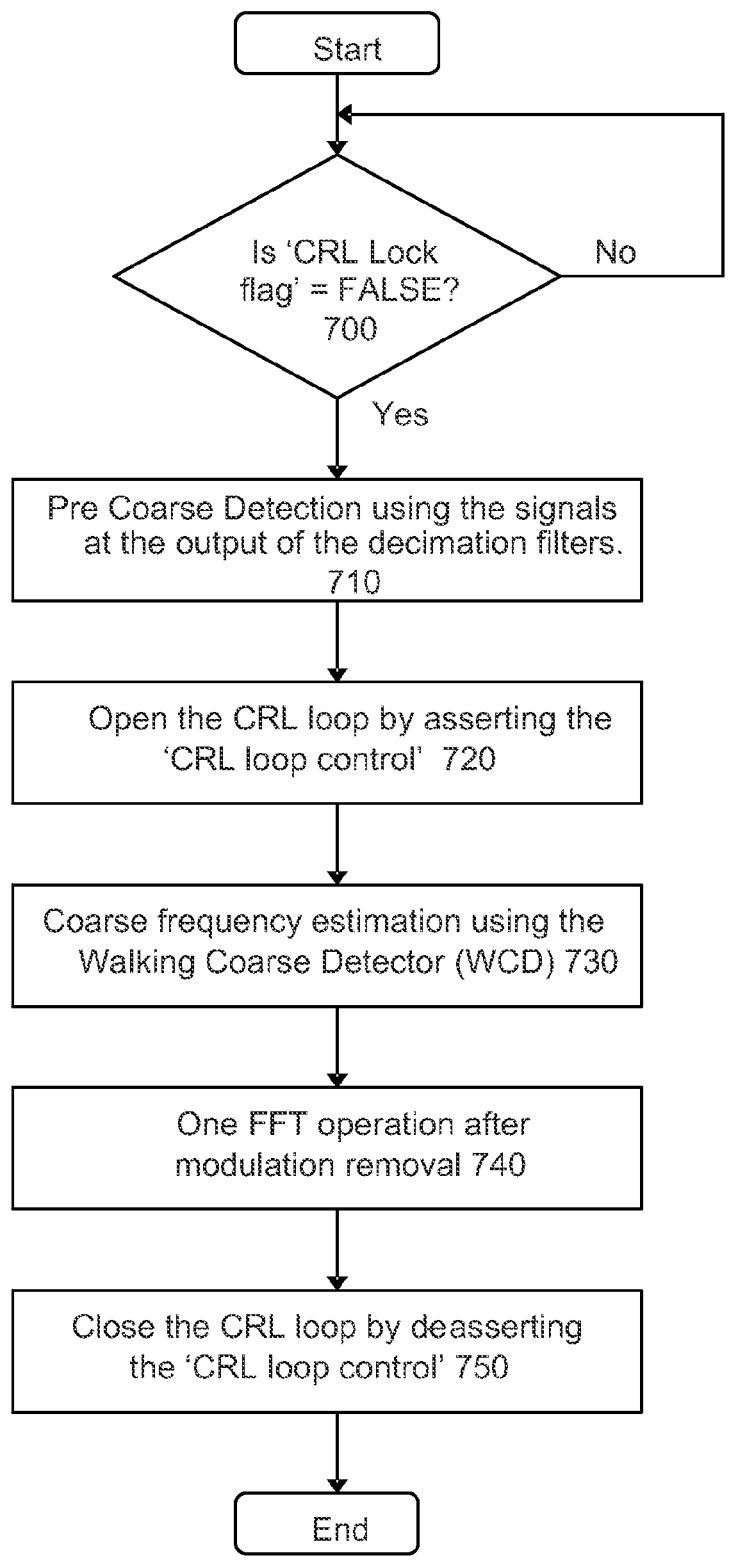
FIG. 7A is a flow diagram of an implementation of a method of main carrier signal acquisition.
Figure 7B:
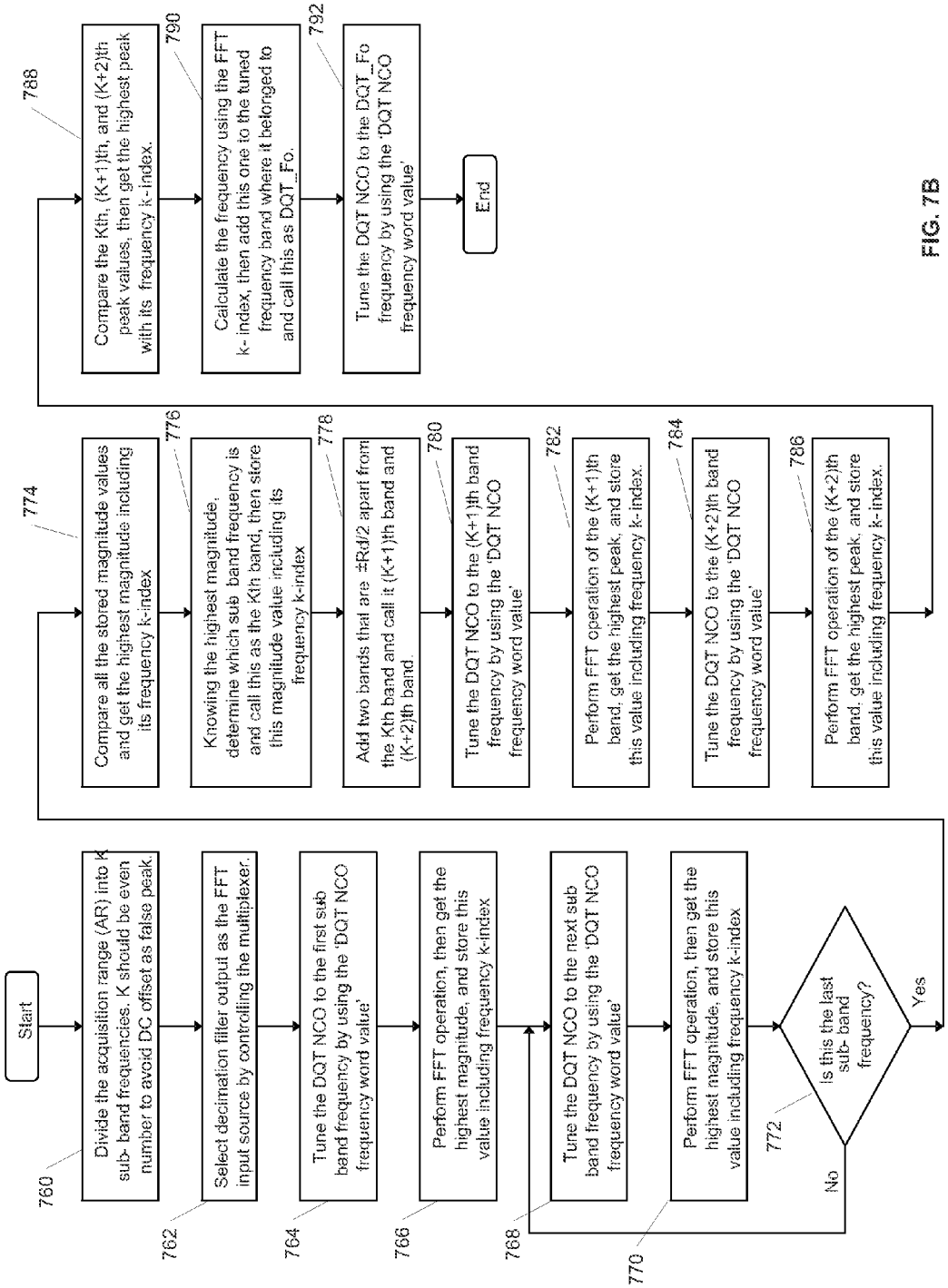
FIG. 7B is a flow diagram of an implementation of a method of pre-coarse detection.
Figure 7C:
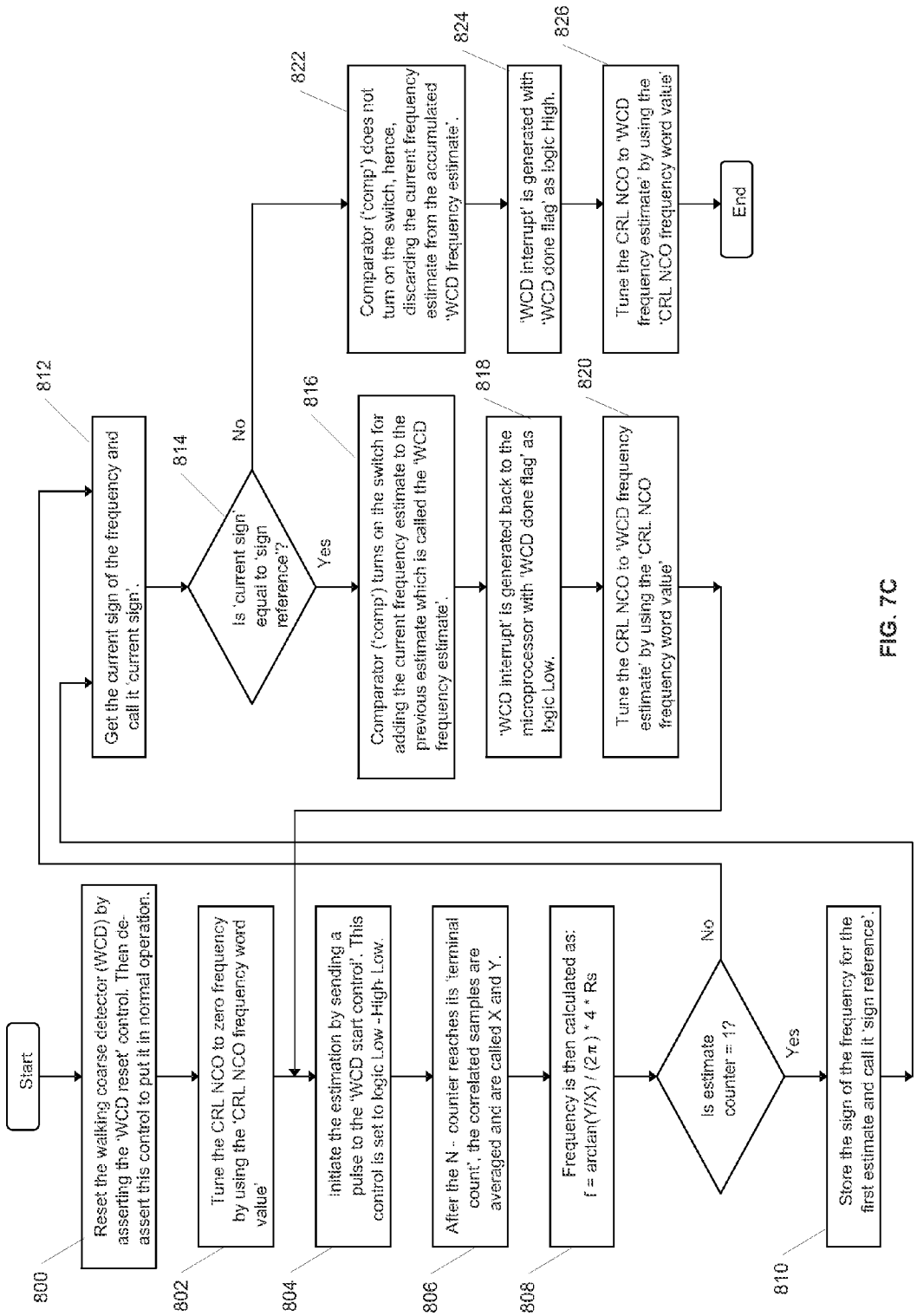
FIG. 7C is a flow diagram of an implementation of a method of walking coarse detection.

FIGS. 7A-C illustrate an implementation of the algorithm in accordance with an embodiment of the system and method disclosed herein. Before the algorithm starts, the loop parameters of CRL have to be determined first using loop equations found in most PLL literatures as known in the prior art. An implementation of the main algorithm is summarized in FIG. 7A. It process begins when the CRL 'lock flag' from its lock detect circuit is not locked (or lock flag=FALSE) 700. When this happens, pre-coarse detection begins its process 710. After this process is complete, the pre-coarse estimate is used to tune the DQT NCO. Then, the loop of CRL is open 720 in order for the WCD to estimate the frequency properly 730. After the WCD estimate, the final estimation is done by one FFT operation together with modulation removal 740. By then, this final estimate is used to tune the CRL NCO. Finally, the loop of CRL is closed 750 and allows the loop to pull in the desired frequency offset.

Figure 8:
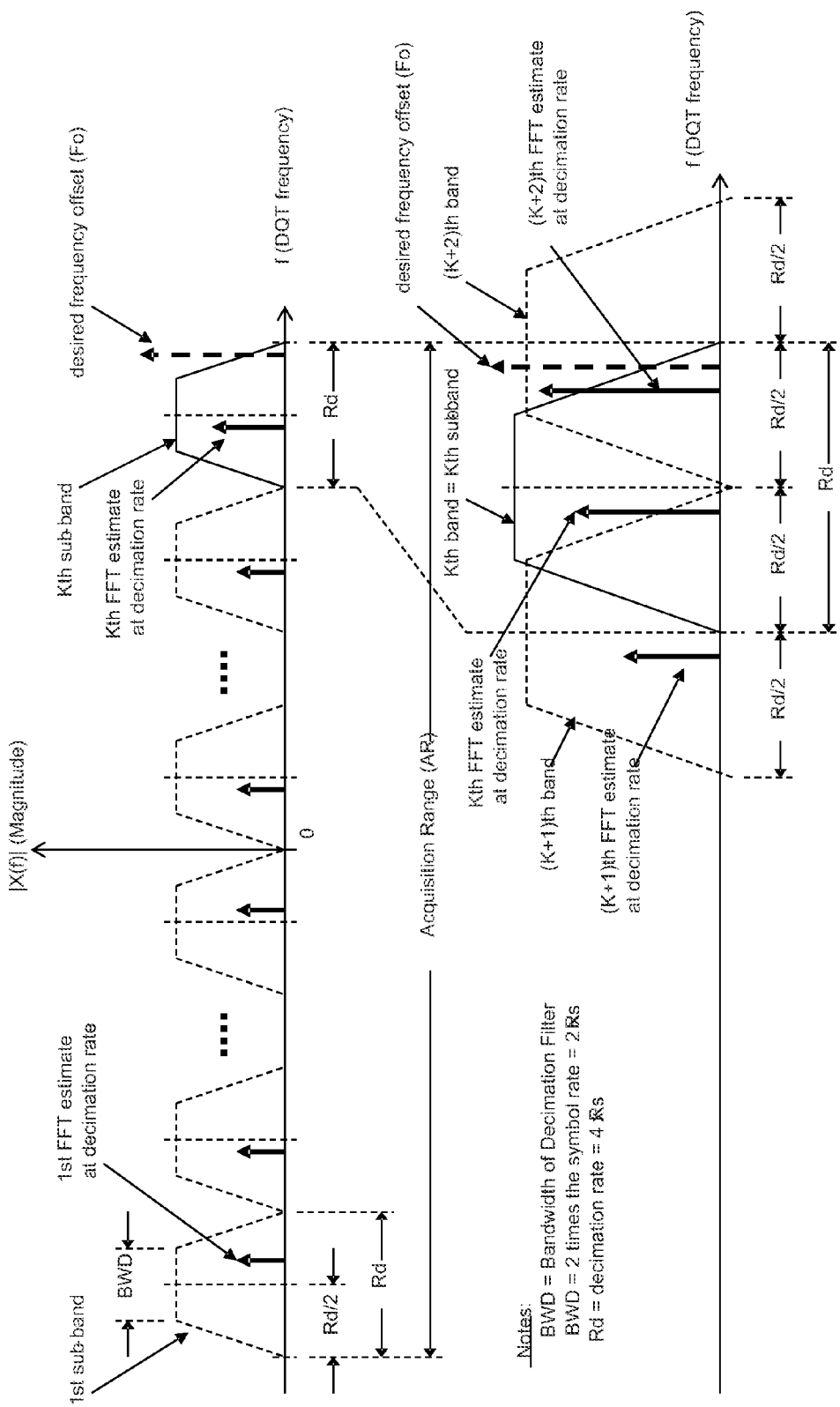
FIG. 8 depicts an implementation of a method of pre-coarse detection over an acquisition range.

FIG. 7B illustrates an example of a detailed algorithm of an implementation of pre-coarse detection. It starts by dividing the acquisition range (AR) into K sub-band frequencies 760 that is graphically shown in FIG. 8. K is selected to be an even number in such a way to avoid DC offset, which may cause false peak during the FFT process. The FFT module selects the decimation filter output as its input source by controlling the multiplexer 762. Then the DQT NCO is tuned to the first sub-band frequency by using the 'DQT NCO frequency word value' 764. FFT operation is performed then and the highest FFT magnitude called the peak is stored including its frequency k-index 766. The process of tuning the DQT NCO for the next sub-band frequency 768 and of performing the FFT operation together with storing the peak and its k-index 770 is repeated until the last sub-band frequency 772. Then, all of the stored peaks are compared to determine the overall highest peak, noting its corresponding k-index 774. The sub-band frequency at which the overall highest peak resides is determined and called it the Kth band 776. Two bands that are ±Rd/2 apart from the Kth band are added and called (K+1)th band and (K+2)th band 778 as shown in FIG. 8. The purpose of this is to analyze the spectra that are filtered out by the decimation filter, i.e. outside the decimation filter bandwidth. Then the DQT NCO is tuned to (K+1)th band 780 and FFT operation is performed where the highest peak and its frequency k-index are stored 782. This process is repeated for (K+2)th band 784, 786. Then, the frequency k-index where the overall highest peak among Kth, (K+1)th, and (K+2)th bands is selected, noting which frequency band it belongs to 788. Using the k-index, the FFT frequency is calculated and it is being added to the frequency band where it belongs to 790. This frequency estimate is specifically referred to as DQT Fo. With this estimate, the DQT NCO is finally tuned to this frequency via the 'DQT NCO frequency word value' 792. The maximum error of the pre-coarse estimate is graphically shown in FIG. 9. As depicted in FIG. 9, the worst-case location of the highest FFT peak of the modulated signal is at the edge (or corner frequency) of the modulated signal that is equal to Rs/2.

Figure 10:
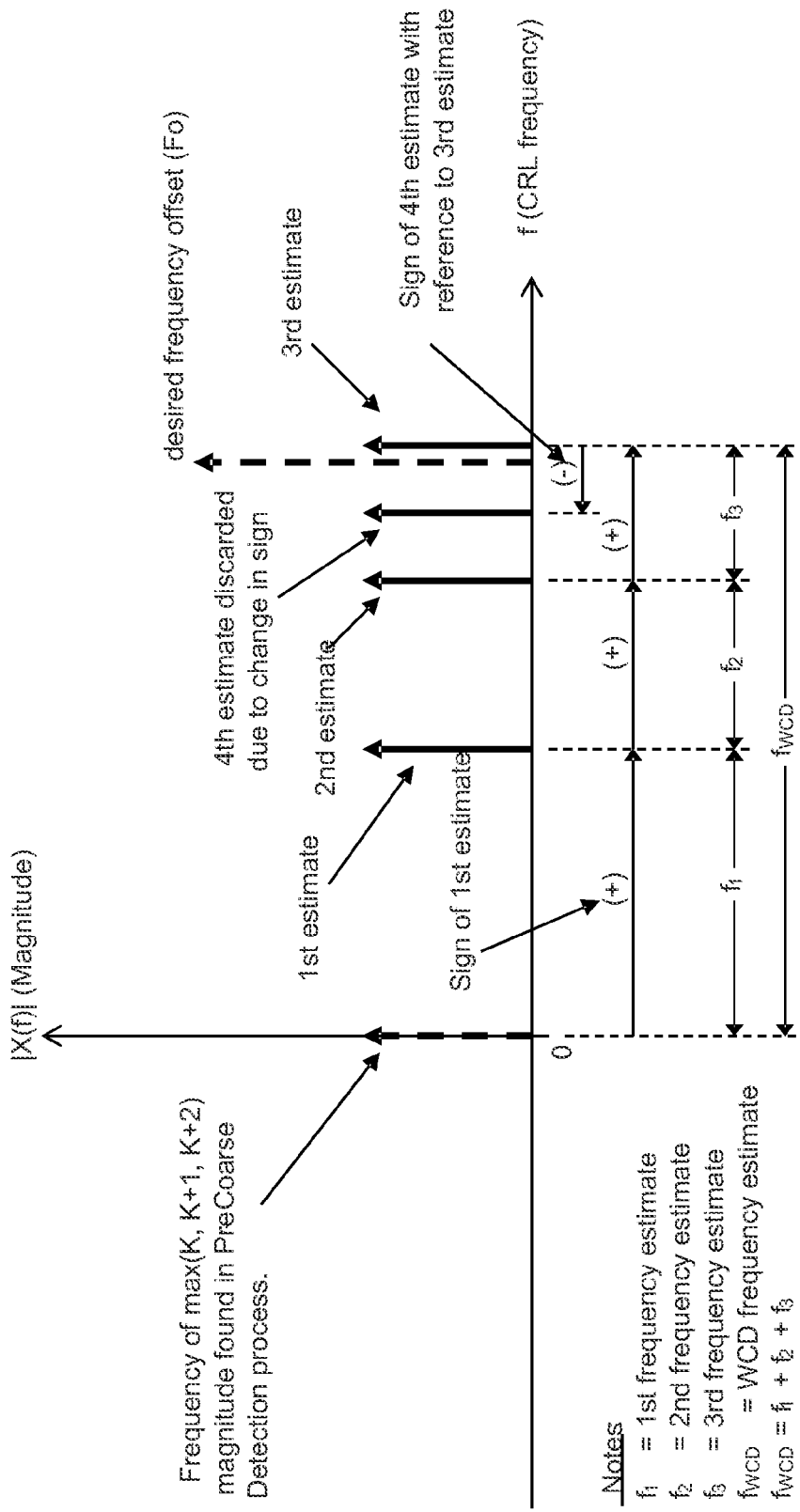
FIG. 10 is a graphical representation of an implementation of a method of walking coarse detection.

After the pre-coarse detection, the next frequency estimate will be accomplished by the walking coarse detector (WCD) 620. Before the WCD operates, the CRL is set to open loop by asserting the 'CRL loop control' via microprocessor. Opening the CRL allows the CRL numerically controlled oscillator (NCO) to run freely without being driven by its loop circuitry. That means the NCO frequency is moving and remains constant at a programmed value. As such, it provides reliable frequency estimation for the WCD 620. FIG. 7C depicts an exemplary implementation of the WCD algorithm. At the beginning of the process, the WCD is being reset by asserting the 'WCD reset' control and then de-asserting this control to put it in normal operation 800. Then the CRL NCO is tuned to zero frequency using the 'CRL NCO frequency word value' 802. The estimation is initiated by sending a pulse to the 'WCD start control' 804. After the N-counter reaches its 'terminal count', the correlated complex input samples are averaged and called X and Y 806. Then, arctangent of (Y/X) is performed and multiplied by 4Rs/(2π), which will result as the frequency estimate 808. At this point, it is the first estimate and the sign of this estimate is stored 810, which will be used for comparison with the next (or "current") estimate, for which the current sign is determined 812. The sign of the first estimate and the sign of the current estimate are compared 814, and if the signs are equal then the comparator ('comp') will turn on the switch 816, which will add the current estimate to the previous estimate (i.e. accumulation of estimates). At the same time, a 'WCD interrupt' is generated 818 and is being received by the microprocessor telling the microprocessor if the estimate is done or not through the state of the 'WCD done flag'. If the 'WCD done flag' is logic low, the estimate is not done yet. The accumulated estimate is then used to tune the CRL NCO via the 'CRL NCO frequency word value' 820. Then the process repeats itself from the point where it will initiate the estimation by sending a pulse to the 'WCD start control', then computing the next estimate, and then comparing the current sign with the sign of the first estimate, and so on as illustrated in FIG. 7C. With this process, the WCD is actually walking towards in the direction where the desired frequency offset is as depicted in FIG. 10. This process stops when the sign of the current estimate is different from the sign of the first estimate, and that current estimate is discarded from the accumulated 'WCD frequency estimate' 822. The 'WCD interrupt' is generated with the 'WCD done flag' as logic "High" 824. The 'WCD frequency estimate' is then used to tune the CRL NCO via the 'CRL NCO frequency word value' 826 which will be ready for one final FFT operation.

Before the final FFT operation starts, modulation removal is performed. As mentioned earlier, to compute for the modulation removal factor $2^m$, m=1 for BPSK, m=2 for QPSK, m=3 for 8-PSK, and m=2 for 16-QAM. After modulation removal is performed, only one FFT operation is required to finish the final estimation. This final FFT frequency estimate is then calculated as follows:

$$f_{FFT} = k_{max} \cdot \frac{F_s}{N_{FFT}} \cdot \frac{1}{2^m}$$

for $$0 \leq k_{max} < \frac{N_{FFT}}{2} \text{(positive frequency)}$$

$$f_{FFT} = (k_{max} - N_{FFT}) \cdot \frac{F_s}{N_{FFT}} \cdot \frac{1}{2^m}$$

for $$N_{FFT} > k_{max} \geq \frac{N_{FFT}}{2} \text{(negative frequency)}$$

where:
$f_{FFT}$=frequency estimated by FFT in Hz
$k_{max}$=k-index of FFT with the highest peak in terms of magnitude, k-index ranges from 0 to ($N_{FFT}$–1)
$N_{FFT}$=number of FFT samples (also called as number of FFT points)
$2^m$=modulation removal factor, for BPSK m=1, QPSK m=2, 16-QAM m=2
$F_s$=sampling rate in Hz (or samples/sec), in this case it is equal to symbol rate (Rs).

After determining the final FFT estimate, the CRL NCO will be programmed by microprocessor using this estimate via setting the 'CRL NCO frequency word value'. Finally, the CRL loop is closed by de-asserting the 'CRL loop control,' which will pull-in the desired carrier and achieve carrier lock thereafter.

Through these processes, the desired frequency offset (Fo) is then:

Fo=DQT_Fo+$f_{WCD}$+$f_{FFT}$ where:
DQT_Fo=frequency offset determined during the pre-coarse detection and it will be used to tune the digital quadrature tuner (DQT)
$f_{WCD}$=WCD frequency estimate which is used to tune the CRL
$f_{FFT}$=frequency estimated by FFT with modulation removal which is used to tune the CRL The implementations listed here, and many others, will become readily apparent from this disclosure. From this, those of ordinary skill in the art will readily understand the versatility with which this disclosure may be applied.

The invention claimed is:

1. A method of rapid non-data aided carrier signal acquisition for a low symbol rate carrier signal, the method comprising:
   receiving, by a receiver, an analog intermediate frequency carrier signal;
   converting the analog intermediate frequency carrier signal to a digital carrier signal using an analog-to-digital converter;
   down-converting the digital carrier signal to a frequency substantially at baseband using a digital quadrature tuner;
   reducing a sampling rate of the digital carrier signal using a decimation filter;
   determining a highest Fast Fourier Transform (FFT) based on a result of one or more FFT's generated by an FFT module using a peak finder;
   selecting an input source for the FFT module using a multiplexer;
   generating a frequency estimate of the digital carrier signal using a walking coarse detector (WCD);
   tuning a carrier recovery loop (CRL) based on the frequency estimate generated by the walking coarse detector;
   determining a final carrier frequency offset estimate using a result of the FFT module, a modulation removal, and the peak finder;
   programming an oscillator within the CRL to the final carrier frequency offset estimate using a processor such that carrier signal lock is achieved;
   correlating a received modulated carrier signal with a delayed version of the received modulated carrier signal using the walking coarse detector (WCD); and
   calculating a first frequency estimate of the digital carrier signal by the walking coarse detector (WCD) using an arctangent function and a multiplier of 4Rs/(2π) where Rs equals a symbol rate of the digital carrier signal.

2. The method of claim 1, wherein the oscillator within the CRL is programmed to have a sampling rate equal to four times a symbol rate of the carrier signal.

3. The method of claim 1, wherein a first discrete complex matched filtered output signal of the walking coarse detector (WCD) is defined as I[n]+jQ[n].

4. The method of claim 3, further comprising inputting the first discrete complex matched filtered output signal of the walking coarse detector (WCD) back into the walking coarse detector (WCD).

5. The method of claim 4, wherein a subsequent discrete complex matched filtered output signal of the walking coarse detector (WCD) equals X+jY where X and Y are determined by the walking coarse detector (WCD) as:

$$X = \frac{1}{N} \sum_{n=1}^{N} (I[n]I[n-1] + Q[n]Q[n-1])$$

$$Y = \frac{1}{N} \sum_{n=1}^{N} (I[n-1]Q[n] - I[n]Q[n-1]).$$

6. The method of claim 5, further comprising calculating an incremental frequency estimate of the digital carrier signal by the walking coarse detector (WCD) as:

$$f_W = \frac{fs_{WCD}}{2\pi} \cdot \text{Tan}^{-1}\left(\frac{Y}{X}\right)$$

where:
$f_W$=frequency estimate per walk of WCD; and
$fs_{WCD}$=walking coarse detector (WCD) sampling rate which is equal to 4 times a symbol rate (Rs) of the digital carrier signal.

7. The method of claim 6, further comprising storing, by the walking coarse detector (WCD), a polarity or sign of the first frequency estimate of the digital carrier signal for comparison with a polarity or sign of a subsequent frequency estimate of the digital carrier signal.

8. The method of claim 7, further comprising adding subsequent frequency estimates to the first frequency estimate when the sign or polarity of the subsequent frequency estimate is the same as the sign or polarity of the first frequency estimate until a subsequent frequency estimate has a sign or polarity that differs from that of the first frequency estimate.

9. A system for rapid non-data aided carrier signal acquisition for a low symbol rate carrier signal, the system comprising:

a receiver configured to receive an analog intermediate frequency carrier signal;

an analog-to-digital converter configured to convert the analog intermediate frequency carrier signal received by the receiver to a digital carrier signal;

a digital quadrature tuner configured to down-convert the digital carrier signal to a frequency substantially at baseband;

a decimation filter configured to reduce a sampling rate of the digital carrier signal substantially at baseband using a decimation filter;

an FFT module configured to generate a result of one or more FFT's and determine a highest Fast Fourier Transform (FFT) based on the result using a peak finder;

a multiplexer configured to select an input source for the FFT module;

a walking coarse detector (WCD) configured to generate a frequency estimate of the digital carrier signal; and a carrier recovery loop (CRL) configured to be tuned based on the frequency estimate generated by the walking coarse detector (WCD), the CRL further comprising an oscillator configured to achieve carrier signal lock by being programmed to a final carrier frequency offset estimate that is determined by a processor using a result of the FFT module, a modulation removal, and the peak finder; and wherein the walking coarse detector (WCD) is further configured to correlate a received modulated carrier signal with a delayed version of the received modulated carrier signal and calculate a first frequency estimate of the digital carrier signal using an arctangent function and a multiplier of $4Rs/(2\pi)$ where Rs equals a symbol rate of the digital carrier signal.

10. The system of claim 9, wherein the oscillator within the CRL is programmed to have a sampling rate equal to four times a symbol rate of the carrier signal.

11. The system of claim 9, wherein a first discrete complex matched filtered output signal of the walking coarse detector (WCD) is defined as $I[n]+jQ[n]$.

12. The system of claim 11, wherein the walking coarse detector (WCD) is further configured to receive as an input the first discrete complex matched filtered output signal that was previously output by the walking coarse detector (WCD).

13. The system of claim 12, wherein a subsequent discrete complex matched filtered output signal of the walking coarse detector (WCD) equals $X+jY$ where X and Y are determined by the walking coarse detector as:

$$X = \frac{1}{N}\sum_{n=1}^{N}(I[n]I[n-1]+Q[n]Q[n-1])$$

$$Y = \frac{1}{N}\sum_{n=1}^{N}(I[n-1]Q[n]-i[n]Q[n-1]).$$

14. The system of claim 13, wherein the walking coarse detector (WCD) is further configured to calculate an incremental frequency estimate of the digital carrier signal by the walking coarse detector (WCD) as:

$$f_W = \frac{fs_{WCD}}{2\pi} \cdot \operatorname{Tan}^{-1}\left(\frac{Y}{X}\right)$$

where:

$f_w$ = frequency estimate per walk of WCD; and $fs_{WCD}$ = walking coarse detector (WCD) sampling rate which is equal to 4 times a symbol rate (Rs) of the digital carrier signal.

15. The system of claim 14, wherein the walking coarse detector (WCD) is further configured to store a polarity or sign of the first frequency estimate of the digital carrier signal for comparison with a polarity or sign of a subsequent frequency estimate of the digital carrier signal.

16. The system of claim 15, wherein the walking coarse detector (WCD) is further configured to add subsequent frequency estimates to the first frequency estimate when the sign or polarity of the subsequent frequency estimate is the same as the sign or polarity of the first frequency estimate until a subsequent frequency estimate has a sign or polarity that differs from that of the first frequency estimate.

* * * * *